Patented July 5, 1949

2,474,901

UNITED STATES PATENT OFFICE 2,474,901

ISOBUTYLENE-NITROSYL CHLORIDE ADDITION

Andrew J. Martin, East Orange, N. J., assignor to Allied Chemical & Dye Corporation, New York, N. Y., a corporation of New York No Drawing. Application April 29, 1948, Serial No. 24,091

6 Claims. (Cl. 260—647)

This invention relates to the production of the normally solid adduct of isobutylene and nitrosyl chloride or bromide.

Certain methods for preparing the solid adduct of isobutylene and nitrosyl chloride or bromide are known. For example, it is known to prepare the nitrosyl chloride adduct by adding isobutylene and concentrated hydrochloric acid to well-cooled amyl nitrite (Ipatieff et al., Chemisches Zentralblatt (1901) II, 1201). This method is also disclosed by Drew and Head, Journal of the Chemical Society (1934) page 49. Another method (U. S. P. 2,394,430 of February 5, 1946, to Crowder et al.) involves reaction of nitrosyl chloride and excess liquid isobutylene under super-atmospheric pressures. The product of the above processes when pure is a colorless solid of empirical formula $C_4H_8NOCl$ melting at about 104° C. Nitrosyl bromide adducts are obtained similarly to nitrosyl chloride adducts.

The chief object of my invention is to accelerate the rate of reaction between nitrosyl chloride or bromide and isobutylene. This object is accomplished by carrying out the reaction in the presence of a catalyst effective for this purpose. Other objects and advantages will appear more fully hereinafter.

The use of a reaction-accelerating catalyst has significant practical advantages for commercial operation. Nitrosyl chloride or bromide is very corrosive toward most construction materials so the material employed in equipment for reactions of nitrosyl chloride or bromide must be relatively expensive. Accordingly it is advantageous if the reaction rate can be accelerated several-fold since the size of the equipment for a given output of product may then be correspondingly reduced, and the cost of equipment per unit of product thus reduced.

I have found that certain specific adsorptive materials are effective as catalysts for the reaction of nitrosyl chloride or bromide with isobutylene to form solid isobutylene-nitrosyl chloride or bromide adduct. Of the materials which I have tested activated carbon is preferred as giving both the greatest acceleration for a given weight of catalyst and at the same time, the best yields of the desired product.

Unlike activated carbon, certain other adsorptive materials and materials of large surface area which I have tested show little or no effect on the reaction rate.

The results obtained on addition to the reaction system of activated carbon will vary with the quantities and quality of the specific activated carbon used. There are no theoretical upper or lower limits to the proportions of catalyst which are operative in my process but in practice the proportions of catalyst employed will be determined by considerations such as the degree of reaction acceleration desired, the cost of catalyst, etc. Proportions of catalyst which are ordinarily suitable vary from about 0.05 gram of catalyst per mol of nitrosyl chloride or bromide reactant to about 30 grams of catalyst per mol of nitrosyl chloride or bromide reactant. Usually the proportion of catalyst employed will be in the range from 1 gram to 15 grams of catalyst per mol of nitrosyl chloride or bromide reactant.

In the discussion which follows my invention is described and illustrated with particular reference to the reaction of nitrosyl chloride with isobutylene, but it is to be understood that the same general considerations apply when nitrosyl bromide is employed in the reaction instead of nitrosyl chloride.

The following examples illustrate my invention, but are not intended to limit the scope of the invention:

*Example 1.*—To a 1 liter glass flask which contained 452 grams (8.06 mols) of liquid commercial tank isobutylene of about 95% purity, which flask was fitted by means of glass joints with a Dry Ice reflux condenser, a thermometer, a glass stirrer and a Dry Ice-acetone jacketed delivery funnel protected with a drying tube, there were added 3.48 grams of powdered commercial activated carbon of vegetable origin. The particle size was such that about 46% was retained on a 325 mesh screen and 54% passed through. The carbon was reactivated before use by heating to the ignition temperature and stirring for about 10 minutes until visible gas evolution ended, then cooling.

Then there were added as rapidly as possible from the delivery funnel with stirring 94 grams (1.44 mols) of commercial nitrosyl chloride which had been freed of impurities (chiefly nitrogen tetroxide) by fractionation to a boiling point of −6° C. to −5° C. The mol ratio of free isobutylene:free nitrosyl chloride at the start of this reaction was 5.6:1. The reaction was allowed to proceed under atmospheric pressure at the reflux temperature of the reaction mixture, which varied from about −12° C. to −7° C. as the composition of the reaction mixture changed during the reaction. 95% of the nitrosyl chloride introduced entered into the reaction after about 0.75 hour (as shown by adding to aqueous sodium hydroxide solution a sample taken from the reaction vessel and analyzing by the Volhard method for chloride ion).

When the reaction of nitrosyl chloride was better than 95% completed all remaining nitrosyl chloride and isobutylene were allowed to boil out of the vessel through a trap containing aqueous sodium hydroxide solution. The product was washed out of the flask with petroleum ether of boiling range 30° C. to 60° C., was washed free of liquid by-product with an additional quantity of the petroleum ether and was airdried. The yield of adduct thus obtained based on the nitrosyl chloride consumed was 76% of theory. The solid product may be further purified and separated from the catalyst by extracting the product from the catalyst with a solvent such as hot benzene and allowing the product to crystallize from solution in the solvent.

When the same procedure was used except that no catalyst was employed the yield of solid adduct on the same basis as above was 76.4% of theory and the time required for 95% completion of reaction of the nitrosyl chloride was 16.4 hours. The rate of reaction thus was increased about 22-fold by the addition of the catalyst.

*Example 2.*—A reaction was carried out with 1.53 mols of nitrosyl chloride and an initial mol ratio of free liquid isobutylene:free nitrosyl chloride of 5.3:1 using the procedure of Example 1 except that the quantity of activated carbon used was 6.5 grams and the temperature at which the reaction proceeded under reflux varied from about −15° C. to −6.5° C. The yield of adduct obtained was 73.9% of theory. The time for 95% completion of reaction of the nitrosyl chloride was about one-half hour.

*Example 3.*—When to 8.7 mols of commercial isobutylene there were added 13.8 grams of the powdered activated carbon of Example 1 and 1.45 mols of nitrosyl chloride were run in as in Example 1, with the reflux temperatures varying from −10° C. to −7° C., the time for 95% reaction of the nitrosyl chloride was reduced to 0.35 hour and the yield of product was 73.4% on the same basis as in Example 1.

In the above examples my process is illustrated in terms of batch operation but continuous operation may also be employed by providing for continuous introduction of the reactants to the reaction vessel and continuous withdrawal of the products. A suitable apparatus for such continuous operation is of the type which comprises an outer tubular reactor down which an inner tubular rotating heat exchange unit passes. This system provides adequate stirring of the reaction mixture but prevents undesirable intermixing of the reaction mixture along the direction of flow.

The use of pure isobutylene in my process is not essential. Thus, the isobutylene may contain other hydrocarbons such as olefins and paraffins normally present in commercial isobutylene. The nitrosyl chloride likewise need not be pure and may, for example, contain about 1 mol percent of impurities likely to be found in commercial nitrosyl chloride such as nitrogen tetroxide and chlorine. However, the presence of an appreciable amount of nitrogen tetroxide, e. g. 10 mol percent or more in the nitrosyl chloride is undesirable since in the presence of such amounts of nitrogen tetroxide the yield of solid product is small and the crude isobutylene-nitrosyl chloride adduct obtained is contaminated with isobutylene-nitrogen tetroxide adduct. The nitrosyl chloride used is likewise preferably kept free of contamination by water since appreciable amounts of water such as 10 mol percent or more in the nitrosyl chloride reduce the yield of solid adduct obtained.

The mol ratio of free liquid isobutylene:free nitrosyl chloride in my process is preferably at least 3:1. At and above this mol ratio the reaction temperature may readily be controlled, e. g. by reflux of the reaction mixture, whereas at much lower mol ratios the reaction temperature may be difficult to control and may rise abruptly. Higher mol ratios of free liquid isobutylene:free nitrosyl chloride than 3:1 may be used and are used, for example, toward the end of a batch or semi-continuous reaction when most of the nitrosyl chloride initially introduced has reacted and a considerable excess of free liquid isobutylene remains in the reaction mixture.

If desired, a solvent inert to the reactants may replace part or all of the excess isobutylene and temperatures may still be adequately controlled, e. g. by reflux.

Temperatures of about −15° C. to 0° C. are well suited for my process; and in the reaction using nitrosyl chloride rather than nitrosyl bromide, especially temperatures between about −12° C. and −6° C. which are the reflux temperatures of isobutylene-nitrosyl chloride mixtures under pressures of about atmospheric, are very suitable for my process. Increasing the temperatures eventually requires operation under more than atmospheric pressures to maintain the reactants liquid, whereas at much lower temperatures the rate of reaction becomes appreciably lower. Temperatures as low as, for example, about −30° C., which may be maintained, for example, by keeping the reaction mixture under reflux at a pressure of about one-third atmosphere, and still lower temperatures are however fully operative in my process.

The time allowed for reaction will depend on the degree of completion to be obtained. With at least a 3:1 mol ratio of isobutylene:nitrosyl chloride the rate of reaction is proportional to the concentration of nitrosyl chloride in the liquid reaction mixture and is independent of the isobutylene concentration. At temperatures of about −30° C. the reaction is considerably slower than at −6° C. and requires about three hours to reach 95% completion in the presence of the activated carbon catalyst.

The solid isobutylene-nitrosyl chloride adduct is conveniently recovered from the liquid byproduct by filtering off the solid and washing the solid free of by-product, e. g. with petroleum ether of boiling range 30° to 60° C. The solid may be extracted away from the catalyst with a solvent, e. g. hot benzene. Dissolved products may be recovered from the solvents if desired by evaporation of any solution removed from the recovery system. If desired, the solid adduct may be recrystallized, e. g. from a weight of benzene about equal to the weight of solid.

I claim:

1. In a process for the production of the solid adduct of isobutylene and a material of the group consisting of nitrosyl chloride and nitrosyl bromide, the improvement which comprises carrying out the reaction between isobutylene and said material in the presence of activated carbon.

2. A process in accordance with claim 1 in which the reaction temperatures are maintained at about the reflux temperatures of the reaction mixture.

3. A process in accordance with claim 2 in which nitrosyl chloride is employed and the reaction temperatures are between about —15° C. and 0° C. and the vapor pressure over the reaction mixture is about atmospheric.

4. A process in accordance with claim 3 in which the initial mol ratio of free isobutylene: free nitrosyl chloride present is at least about 3:1.

5. A process in accordance with claim 1 in which the amount of water introduced into the reaction zone is less than 10 mol percent of the nitroso material introduced into the reaction zone.

6. A process for the production of isobutylene-nitrosyl chloride adduct which comprises contacting under about atmospheric pressure nitrosyl chloride at least 90 mol percent pure with activated carbon and with liquid isobutylene in an initial mol ratio of liquid isobutylene:nitrosyl chloride of at least 3:1 while maintaining temperatures between about —15° C. and 0° C.; filtering off solid isobutylene-nitrosyl chloride adduct from the liquid by-products; washing the solid adduct; extracting the solid adduct from the activated carbon with a solvent; and recovering solid adduct from the solvent.

ANDREW J. MARTIN.

No references cited.